United States Patent
Nishio

(10) Patent No.: US 10,148,827 B2
(45) Date of Patent: Dec. 4, 2018

(54) DATA TRANSMISSION SYSTEM AND DATA TRANSMISSION METHOD SUITABLE FOR DETECTING PROBLEMS IN IMAGE PROCESSING

(71) Applicant: KYOCERA Document Solutions Inc., Osaka (JP)

(72) Inventor: Takatoshi Nishio, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/731,175

(22) Filed: Apr. 26, 2017

(65) Prior Publication Data

US 2017/0366683 A1    Dec. 21, 2017

(30) Foreign Application Priority Data

Jun. 15, 2016  (JP) ................. 2016-119191

(51) Int. Cl.
*H04N 1/04* (2006.01)
*H04N 1/00* (2006.01)

(52) U.S. Cl.
CPC ....... *H04N 1/00034* (2013.01); *H04N 1/0009* (2013.01); *H04N 1/00015* (2013.01); *H04N 1/00039* (2013.01); *H04N 1/00053* (2013.01); *H04N 1/00061* (2013.01); *H04N 2201/0094* (2013.01)

(58) Field of Classification Search
CPC .......... H04N 1/00034; H04N 1/00015; H04N 1/00039; H04N 1/00053

USPC ....................................................... 358/1.15
See application file for complete search history.

(56) References Cited

U.S. PATENT DOCUMENTS

2012/0081744 A1* 4/2012 Kadota ............... G06F 3/1211
                                                          358/1.15

FOREIGN PATENT DOCUMENTS

JP    2008-300920 A    12/2008

* cited by examiner

*Primary Examiner* — Houshang Safaipour
(74) *Attorney, Agent, or Firm* — Hawaii Patent Services; Nathaniel K. Fedde; Kenton N. Fedde

(57) ABSTRACT

Provided is a data transmission system for detecting and predicting the occurrence of problems in image processing of a printing job before starting printing. A gateway registers a printing job that is received from a user terminal in memory, then transmits the printing job to a MFP. The MFP transmits printing data information to the gateway indicating the data amount in time when an image processing unit performs image processing on the printing job. The user terminal transmits printing data information to the gateway indicating the data amount in time when a simulated image processing unit perform a simulation process on the printing job. The gateway compares the printing data information, and when there is a difference in data amounts, registers problem information in memory indicating that there is a problem in image processing by the simulated image processing unit or the image processing unit.

7 Claims, 5 Drawing Sheets

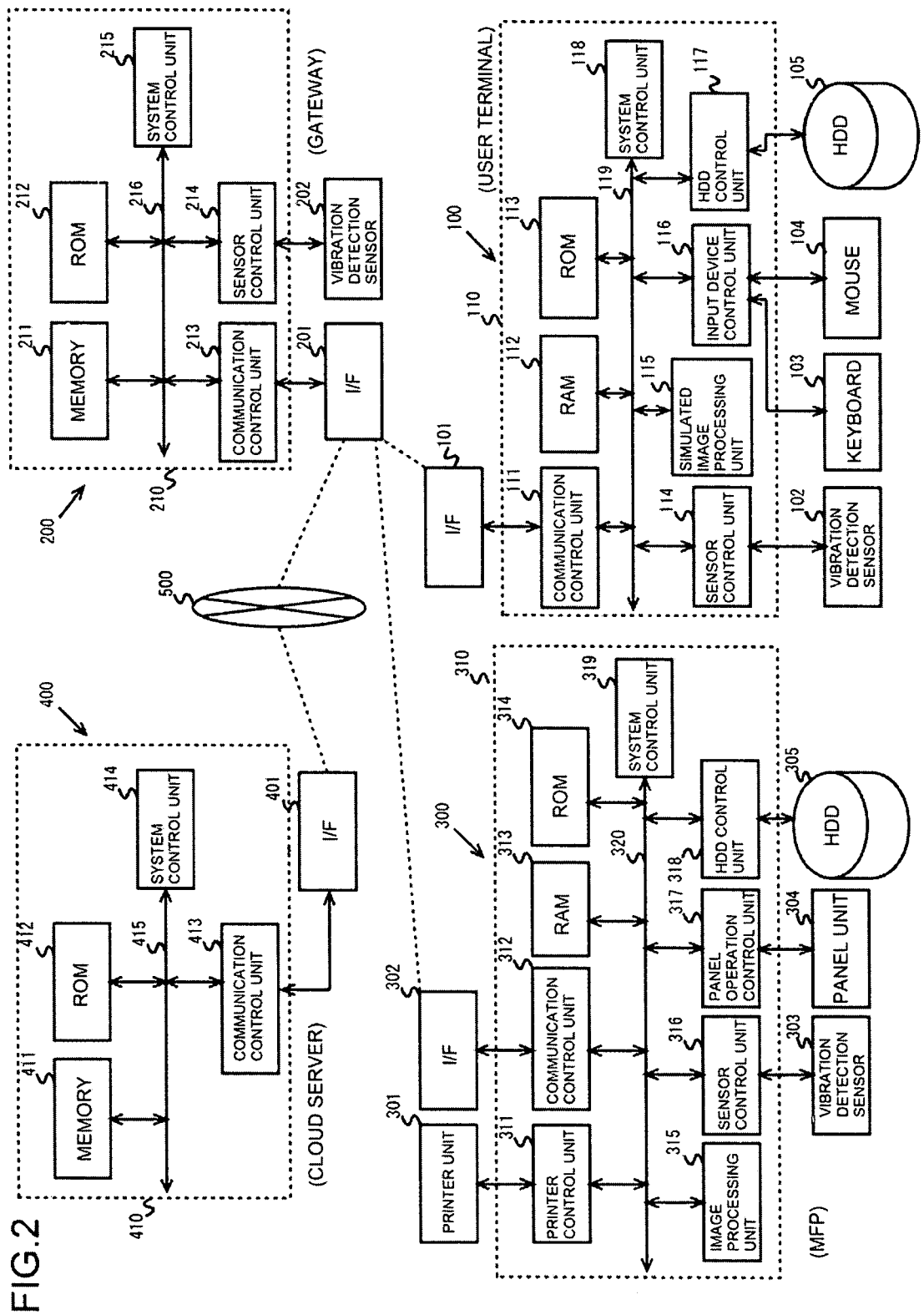

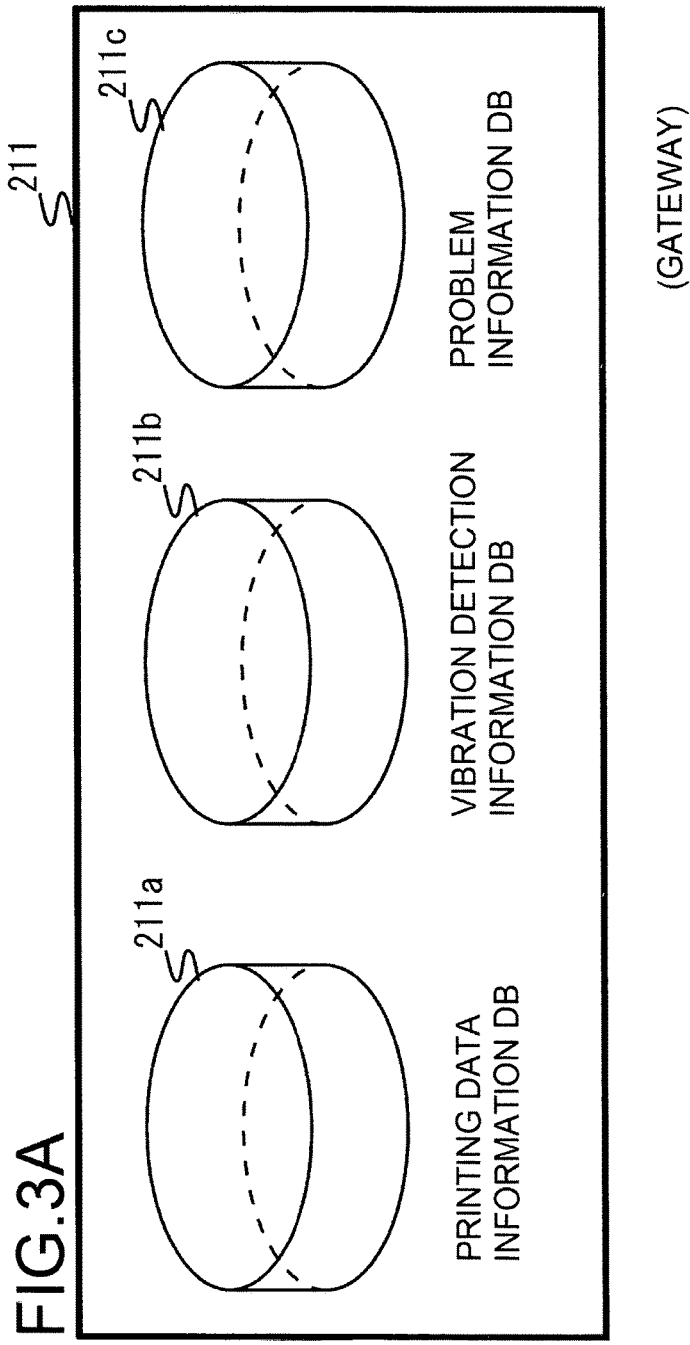

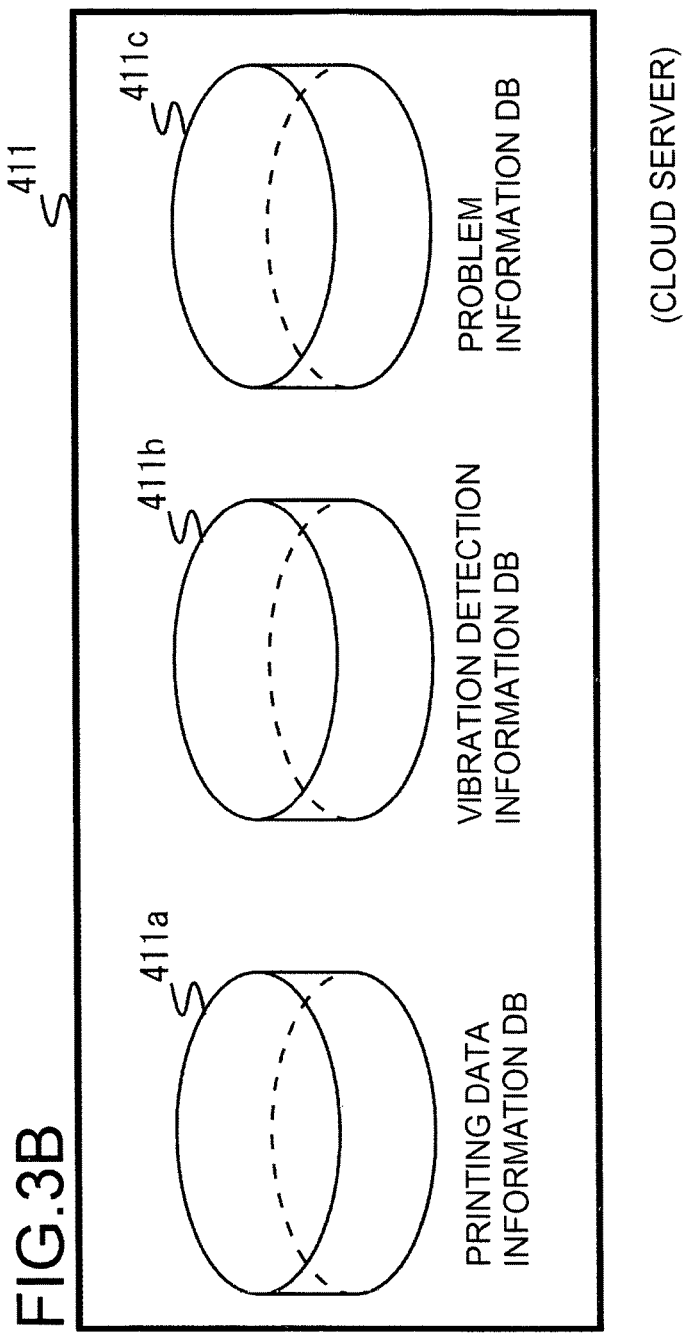

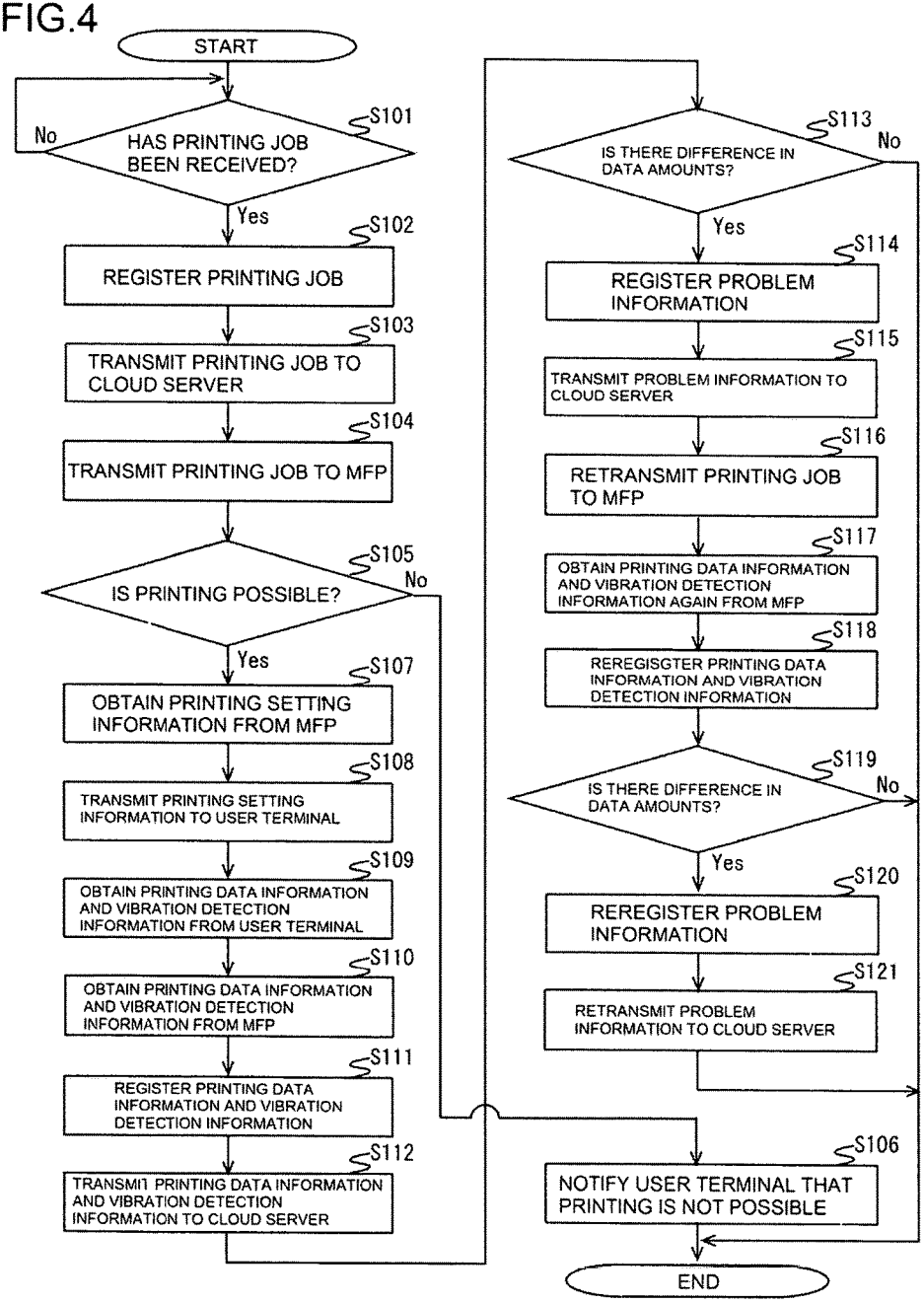

DATA TRANSMISSION SYSTEM AND DATA TRANSMISSION METHOD SUITABLE FOR DETECTING PROBLEMS IN IMAGE PROCESSING

INCORPORATION BY REFERENCE

This application is based on and claims the benefit of priority from Japanese Patent Application No. 2016-119191 filed on Jun. 15, 2016, the contents of which are hereby incorporated by reference.

BACKGROUND

The present disclosure relates to a data transmission system and data transmission method suitable for detecting problems in image processing.

In an image-forming apparatus that is a MFP (Multifunction Peripheral) such as a printer, multifunction printer, combined machine and the like, for example, there are models that are capable of private printing. In other words, in private printing, authentication information (password or the like) is used when registering a printing job in the image-forming apparatus from a user terminal, for example, via a network such as a LAN (Local Area Network). Then, after authentication that is required for the login process on the image-forming apparatus side is successful, it is possible to execute printing processing for a selected printing job.

Incidentally, a HDD (Hard Disk Drive) that is a storage device for storing various application programs and printing jobs is mounted in the user terminal and image-forming apparatus. The HDD is advantageous in that the storage capacity is large, however is disadvantageous in that it does not handle vibration well. When a problem occurs in the HDD due to vibration or the like, it may not be possible to perform writing and reading of data properly.

In typical technology for eliminating a problem such as this, there is an image-processing apparatus that has a vibration detection sensor for determining whether or not vibration has an effect on the HDD, and a storage controller that stores information in the HDD. There is an image-processing apparatus in which the storage controller switches the information storage destination from the HDD to a nonvolatile memory when the vibration detection sensor detects vibration.

SUMMARY

A data transmission system according to the present disclosure includes: a user terminal that has a first storage device, and a simulated image processing unit, the simulated image processing unit performing a simulation process on job data; an image forming apparatus that has a second storage device and an image processing unit, the image processing unit performing image processing on the job data; and a relay device that has a third storage device, registers job data that is received from the user terminal in the third storage device, and then transmits the job data to the image forming apparatus. The user terminal transmits first information for the job data that is stored in the first storage device to the relay device. The image forming apparatus registers the job data that is received from the relay device in the second storage device, and transmits second information for the job data to the relay device. The relay device compares the first information with the second information, and when there is a difference in the data amounts, registers problem information that indicates that there is a problem in image processing of the simulated image processing unit or the image processing unit in the storage device.

A data transmission method according to the present disclosure is executed by a data transmission system that includes: a user terminal having a first storage device and a simulated image processing unit; an image forming apparatus having a second storage device and an image processing unit; and a relay device having a third storage device. In the data transmission method, the user terminal transmits job data; the user terminal transmits first information for the job data that is stored in the first storage device to the relay device; the relay device registers the job data that is received from the user terminal in the third storage device, and then transmits the job data to the image forming apparatus; the image forming apparatus registers the job data that is received from the relay device in the second storage device, and transmits second information for the job data to the relay device; and the relay device compares the first information with second information, and when it is determined that there is a difference in the data amounts, registers problem information in the storage device indicating that there is a problem by the simulated image processing unit or by the image processing unit in the storage device.

BRIEF DESCRIPTION OF THE DRAWINGS

FIG. 2 illustrates an example of the configuration of the user terminal, gateway, MFP and cloud server in FIG. 1.

FIG. 3A illustrates an example of a database inside the memory of the gateway in FIG. 1.

FIG. 3B illustrates an example of a database inside the memory of the cloud server in FIG. 1.

FIG. 4 illustrates steps of a process for the data transmission method in the data transmission system in FIG. 1.

DETAILED DESCRIPTION

Figure 1:
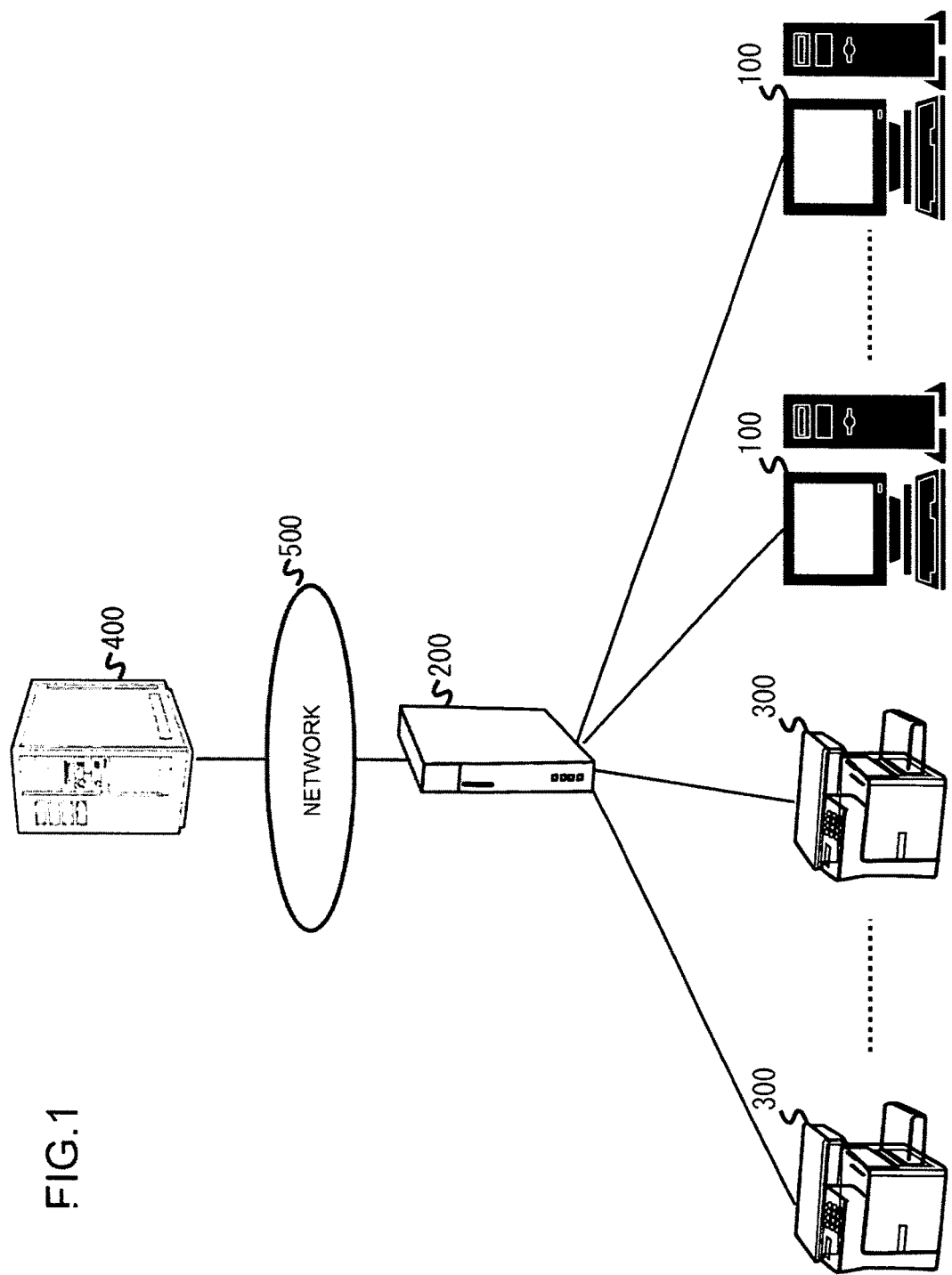
FIG. 1 illustrates an embodiment of the data transmission system of the present disclosure.

In the following, an embodiment of the data transmission system of the present disclosure will be explained with reference to FIG. 1 to FIG. 4. As an example of an image-forming apparatus that is included in the data transmission system in the following explanation, there is, for example, a MFP (Multifunction Peripheral). An MFP is a complex peripheral machine that has a printing function, copying function, FAX function, data transmitting/receiving function via a network, and the like.

First, as illustrated in FIG. 1, the data transmission system includes a user terminal 100, a gateway 200 as relay device, a MFP 300, and a cloud server 400. The user terminal 100 and the MFP 300 are connected via the gateway 200. The gateway 200 and the cloud server 400 are connected via a network 500. The cloud server 400 may be omitted. Moreover, the user terminal 100 and the MFP 300 may be a single unit, or may be plural units. Furthermore, the relay device may also be a document management server or a system management server.

Here, the MFP 300 has a private printing function. In other words, in private printing, a printing job is registered, for example, via the gateway 200 from the user terminal 100 to the MPF 300 using authentication information such as a user name, password and the like. Then, after passing authentication on the MFP 300 side necessary for the login process, printing of the selected printing job is executed.

The gateway 200 in this embodiment, as will be described in detail later, stores problem information and the like that indicates that there is a problem in image processing (rasterization) of a printing job, for example. The gateway 200 stores problem information and the like when, for example, there is a difference between the amount of data of printing data that is generated by the user terminal 100 in a simulation process and the amount of data of printing data just before starting printing that is generated by the MFP 300 in image processing. As problem information, data indicating a difference in data amounts, and data related to image processing problems may be used. Here, as data related to image processing problems, error codes that indicate problems during image processing (rasterization) of a printing job, for example, may be used. Moreover, by linking error codes to a simulated image processing unit 115 (described later) or an image processing unit 315 (described later), it is possible to check whether a problem occurred in either the simulated image processing unit 115 or the image processing unit 315. Furthermore, when using the cloud server 400, as in the case of the gateway 200, it is possible to store problem information.

Next, an example of the configuration of the user terminal 100, the gateway 200, the MPF 300, and the cloud server 400 will be explained with reference to FIG. 2 and FIGS. 3A and 3B. First, the user terminal 100 includes a control unit 110 for controlling an I/F (interface) 101, a vibration detection sensor 102, a keyboard 103, a mouse 104, and a HDD (Hard Disk Drive) 105.

The I/F 101, via the gateway 200, takes charge of communication with the MFP 300, other user terminals 100 and the like. The I/F 101, via the gateway 200, may also take charge of communication with a contents server, web server and the like. The vibration detection sensor 102 detects vibration that is applied to the HDD 105. The keyboard 103 is an input device for inputting characters and the like to the control unit 110. The mouse 104 is an input device for giving instructions such as the input location and the like to the control unit 110. The HDD 105 is a storage device for storing application programs and the like for providing the various functions of the user terminal 100.

The control unit 110 is a processor that controls the overall operation of the user terminal 100 by executing application programs, control programs and the like. The control unit 110 includes a communication control unit 111, a RAM (Random Access Memory) 112, a ROM (Read Only Memory) 113, a sensor control unit 114, a simulated image processing unit 115, an input device control unit 116, a HDD control unit 117, and a system control unit 118. Moreover, these are connected to a data bus 119.

The communication control unit 111, via the I/F 101, performs control of transmitting and receiving data and the like via the gateway 200. The RAM 112 is a work memory for executing programs. Control programs for performing operation checks of each of the units are stored in the ROM 113. The sensor control unit 114 controls the detection operation by the vibration detection unit 102, and notifies the system control unit 118 of vibration detection information indicating the detection results by the vibration detection sensor 102.

The simulated image processing unit 115 executes a simulation process (simulation) that is the same as the image processing (rasterization) that will be executed for a printing job by the image processing unit 315 on the MFP 300 side. The data amount of printing data after the simulation process is checked at the instant that the system control unit 118 stores the data in the HDD 105, for example. The simulated image processing unit 115 can be achieved by installing an emulator in the user terminal 100 that executes the same processing as the image processing unit 315 on the MFP 300 side. Moreover, the target of execution of the simulated image processing unit 115 is a printing job that is transmitted to the MFP 300, and the target of execution by the image processing unit 315 on the MFP 300 side is a printing job that is received from the user terminal 100. In other words, the simulated image processing unit 115 executes a simulation process on a printing job that is transmitted to the MFP 300 side. Moreover, the simulated image processing unit 115 executes a simulation process on a printing job based on printing setting information on the MFP 300 side. As printing setting information on the MFP 300 side, there is information necessary for printing such as color settings, paper size, font size and the like.

The input device control unit 116 controls the input operation by the keyboard 103 and the mouse 104, and gives the input signals from the keyboard 103 and the mouse 104 to the control unit 110. The HDD control unit 117 controls reading data from and writing to the HDD 105.

The system control unit 118 controls the cooperative operation and the like of each of the units. Moreover, when there is an instruction from the keyboard 103 or the mouse 104 to register a printing job in the MFP 300, the system control unit 118 transmits the printing job to the gateway 200 via the I/F 101. Moreover, the system control unit 118 transmits printing data information to the gateway 200 indicating the amount of data of printing data generated by the simulated image processing unit 115. In this case, the system control unit 118 transmits vibration detection information by the vibration detection sensor 102. The vibration detection information by the vibration detection sensor 102 may be data at the instant that printing data that is included in the printing job is written to the HDD 105, or may be data at the instant that printing data is read from the HDD 105. Moreover, a printing job is an example of job data. A printing job includes printing data, data that indicates the number of pages, data that indicates the size and type of printing paper, data indicating the color and the like of the printing font and the like. Printing data information is an example of job data information for a printing job.

The gateway 200 includes a control unit 210 that controls an I/F 201 and a vibration detection sensor 202. The I/F 201 takes charge of communication with a user terminal 100, MFP 300 and the like. Moreover, the I/F 201, via a network 500, takes charge of communication with the cloud server 400. The I/F 201, via the network 500, may also take charge of communication with a content server or a web server or the like. The vibration detection sensor 202 detects vibration that is applied to the gateway main body. The vibration detection sensor 202 may also be omitted.

The control unit 210 is a processor that controls the overall operation of the gateway 200 by executing application programs and control programs. The control unit 210 includes a memory 211, a ROM 212, a communication control unit 213, a sensor control unit 214 and a system control unit 215. Moreover, these are connected to a data bus 216.

The memory 211 is a work memory for executing programs. Moreover, as illustrated in FIG. 3A, the memory 211 has a printing data information DB (database) 211a, a vibration detection information DB 211b, and a problem information DB 211c. The printing data information DB 211a registers printing data information from the user terminal 100 that indicates the amount of data of printing data after a simulation process by the simulated image processing unit 115. The vibration detection information DB 211b registers vibration detection information by the vibration detection sensor 102. The problem information DB 211c registers problem information (data indicating the difference between amounts of data, and data related to a problem in image processing). Here, as described above, as data related to image processing problems, error codes that indicate problems during image processing (rasterization) of a printing job, for example, may be used. Moreover, as described above, by linking error codes to a simulated image processing unit 115 (described above) or an image processing unit 315 (described later), it is possible to check whether a problem occurred in either the simulated image processing unit 115 or the image processing unit 315 (described later).

A printing job and data amount received from a user terminal 100, and data amount obtained from the MFP 300 are registered in the printing data information DB 211a. Vibration detection information by the vibration detection sensor 102 that is received from the user terminal 100 and vibration detection information by the vibration detection sensor 303 (described later) that is obtained from the MFP 300 are registered in the vibration detection information DB 211b. Moreover, vibration detection information by the vibration detection sensor 202 may also be registered in the vibration detection information DB 211b.

Here, printing data information that is obtained from the MFP 300 is the amount of data of printing data just before starting printing by image processing (rasterization) of a printing job transmitted from the user terminal 100 to the MFP 300 via the gateway 200. In other words, a printing job from a user terminal 100 is temporarily transmitted to the MFP 300 via the gateway 200. The gateway 200 requests the MFP 300 to transmit printing data information that indicates the amount of data of printing data just before starting printing by image processing (rasterization) of the transmitted printing job, and registers the printing data information obtained from the MFP 300 in the printing data information DB 211a. In this case, the gateway 200 also requests vibration detection information by the vibration detection sensor 303 (described later). Moreover, the gateway 200 compares the amount of data of the printing data from the user terminal 100 after the simulation process with the amount of data of the printing data from the MFP 300 just before starting printing and when there is a difference in the data amounts, registers problem information in the problem information DB 211c. In addition to data indicating the difference in the data amounts described above and data related to problems in image processing, the problem information may also include, for example, the registration date of the printing data information, vibration detection information and the like.

Control programs for performing operation checks of each of the units are stored in the ROM 212. The communication control unit 213, via the I/F 201, performs control of transmitting and receiving data and the like between the user terminal 100 and the MFP 300. Moreover, the communication control unit 213, via the I/F 201, performs control of transmitting and receiving data and the like via the network 500. The sensor control unit 214 controls the detection operation by the vibration detection sensor 202, and notifies the system control unit 215 of the vibration detection information by the vibration detection sensor 202.

The system control unit 215 controls cooperative operation and the like of each of the units. Moreover, the system control unit 215 registers a printing job and printing data information from the user terminal 100 in the printing data information DB 211a, and registers vibration detection information by the vibration detection sensor 102 from the user terminal 101 in the vibration detection information DB 211b. Furthermore, the system control unit 215 compares the amount of data of the printing data from the user terminal 100 after the simulation process with the amount of data of printing data from the MFP 300 just before starting printing, and when there is a difference in the data amounts, registers problem information in the problem information DB 211c. The system control unit 215 also transmits the printing job and printing data information that is registered in the printing data information DB 211a, the vibration detection information that is registered in the vibration detection information DB 211b, and the problem information that is registered in the problem information DB 211c to the cloud server 400 via the network 500.

The MFP 300 includes a control unit 310 that controls a printer unit 301, an I/F 302, a vibration detection sensor 303, a panel unit 304, and a HDD 305. The MFP 300 may also include a scanner unit, a FAX unit and the like.

The printer unit 301 is a device for printing images on paper based on printing data that is outputted from the control unit 310. The I/F 302, via the gateway 200, takes charge of communication with other MFPs 300, user terminals 100 and the like. The I/F 302, via the gateway 200, may also take charge of communication with a content server, web server and the like. The vibration detection sensor 303 detects vibration that is applied to the HDD 305 and the like. The panel unit 304 is a device such as a touch panel that performs displays for the MFP 300 printing function, copy function, FAX function, data transmitting/receiving function via a network, and displays for various settings. The HDD 305 is a storage device that stores application programs and the like for providing the various functions of the MFP 300. Moreover, the HDD 305 has user boxes, for example, for storing registered printing jobs from user terminals 100.

The control unit 310 is a processor that controls the overall operation of the MFP 300 by executing image processing programs, control programs and the like. The control unit 310 includes a printer control unit 311, a communication control unit 312, a RAM 313, a ROM 314, an image processing unit 315, a sensor control unit 316, a panel operation control unit 317, a HDD control unit 318, and a system control unit 319. Moreover, these units are connected to a data bus 320.

The printer control unit 311 controls the printing operation of the printer unit 301. The communication control unit 312, via the I/F 302, performs control of transmitting and receiving data and the like via the gateway 200. The RAM 313 is a work memory for executing programs. Control programs for performing operation checks of each of the units are stored in the ROM 314. The image processing unit 315, for example, performs image processing (rasterization) of a printing job that is registered in a user box of the HDD 305. The system control unit 319 temporarily stores printing data that has undergone image processing by the image processing unit 315 in the RAM 313. Moreover, the system control unit 319 transmits the amount of data of printing data that is generated in image processing by the image processing unit 315 to the gateway 200.

The sensor control unit 316 controls the detection operation by the vibration detection sensor 303, and notifies the system control unit 319 of the vibration detection information by the vibration detection sensor 303. The panel operation control unit 317 controls the display operation of the panel unit 304. Moreover, the panel operation control unit 317, via the panel unit 304, receives start settings for printing, copying, FAX, data transmission/reception via the gateway 200 and the like. The HDD control unit 318 controls reading of data from and writing of data to the HDD 305.

The system control unit 319 causes the HDD control unit 318 to register a printing job received from the gateway 200 in a user box of the HDD 305. Moreover, the system control unit 319, according to a request from the gateway 200, transmits printing data information that indicates the data amount of printing data generated in image processing by the image processing unit 315, and vibration detection information by the vibration detection sensor 303 to the gateway 200. The vibration detection information by the vibration detection sensor 303 may be information at the instant when a printing job is received from the gateway 200, or may be information at the instant that a printing job is registered in a user box of the HDD 305. The vibration detection information by the vibration detection sensor 303 may also be information at the instant when a printing job is read from the HDD 305, or may be information at the instant when image processing of a printing job is executed by the image processing unit 315.

The cloud server 400 includes a control unit 410 that controls an I/F 401. The I/F 401 takes charge of communication with the gateway 200 via the network 500. The control unit 410 is a processor that controls the overall operation of the cloud server 400 by executing application programs, control programs and the like. The control unit 410 includes a memory 411, a ROM 412, a communication control unit 413, and a system control unit 414. Moreover, these units are connected to a data bus 415.

The memory 411 is a work memory for executing programs. Moreover, as illustrated in FIG. 3B, the memory 411 has a printing data information DB 411a, a vibration detection information DB 411b, and a problem information DB 411c. The printing data information DB 411a a registers a printing job and printing data information that are received from the gateway 200. The vibration detection information DB 411b registers vibration detection information that is received from the gateway 200. The problem information DB 411c registers problem information that is received from the gateway 200.

Control programs for performing operation checks for each of the units are stored in the ROM 412. The communication control unit 413, via the I/F 401, performs control of transmitting and receiving data and the like with the gateway 200 via the network 500. Moreover, the communication control unit 413, via the gateway 200, performs control of transmitting and receiving data and the like with a user terminal 100 and the MFP 300 via the network 500.

The system control unit 414 registers a printing job and printing data information from the gateway 200, vibration detection information, and problem information in the printing data information DB 411a, vibration detection information DB 411b and problem information DB 411c of the memory 411, respectively. Moreover, the system control unit 414, according to a request from the gateway 200, transmits a printing job and printing data information, vibration detection information, and problem information that are registered in the printing data information DB 411a, vibration detection information DB 411b and problem information DB 411c, respectively.

Next, the data transmission method of the data transmission system will be explained with reference to FIG. 4. In the following, the explanation will center on the processing by the gateway 200. Moreover, in the following, when a printing job from a user terminal 100 is registered in the MFP 300, it is presumed that vibration detection information by the vibration detection sensor 102 is transmitted in addition to the printing job. Moreover, in the following, the case is presumed in which a simulation process by the simulated image processing unit 115 on the user terminal 100 side is performed normally.

(Step S101)

First, the system control unit 215 determines whether or not a printing job has been received.

In this case, when there is no notification from the communication control unit 213 indicating that a printing job has been received from a user terminal 100, the system control unit 215 determines that a printing job has not been received (step S101: NO).

However, when there is a notification from the communication control unit 213 indicating that a printing job has been received from a user terminal 100, the system control unit 215 determines that a printing job has been received (step S101: YES), and moves to step S102.

(Step S102)

The system control unit 215 registers the printing job.

In this case, the system control unit 215 registers the printing job that the communication control unit 213 receives from a user terminal 100 in the printing data information DB 211a of the memory 211.

(Step S103)

The system control unit 215, via the communication control unit 213, transmits the printing job that is registered in the printing data information DB 211a of the memory 211 to the cloud server 400.

In this case, the system control unit 414 of the cloud server 400 registers the printing job that is received from the gateway 200 in the printing data DB 411a of the memory 411.

(Step S104)

The system control unit 215 transmits the printing job to the MFP 300.

In this case, the system control unit 215, via the communication control unit 213, transmits the printing job that is registered in the printing data information DB 211a of the memory 211 to the MFP 300.

When this happens, the system control unit 319 of the MFP 300 causes the HDD control unit 318 to register the printing job that is received from the gateway 200 in a user box of the HDD 305. Moreover, the system control unit 319 of the MFP 300 instructs the image processing unit 315 to perform image processing of the printing job that is registered in the user box of the HDD 305.

(Step S105)

The system control unit 215 determines whether or not printing is possible on the MFP 300 side.

In this case, the system control unit 215, via the communication control unit 213, inquires whether or not printing is possible on the MFP 300 side, and when the MFP 300 responds that printing is not possible, determines that printing is not possible on the MFP 300 side (step S105: NO), and moves to step S106. As conditions in which printing is not possible on the MFP 300 side, the occurrence of a paper jam, insufficient toner, insufficient paper, and the like are assumed.

However, when the MFP 300 side responds that printing is possible, the system control unit 215 determines that printing is possible on the MFP 300 side (step S105: YES), and moves to step S107.

(Step S106)

The system control unit 215 notifies the user terminal 100 that printing is not possible, and ends processing.

In this case, the system control unit 215 may also search for another MFP 300 that is capable of printing, and then end processing after notifying the user terminal 100 of the other MFP that is capable of printing.

(Step S107)

The system control unit 215 obtains printing setting information from the MFP 300.

In this case, the system control unit 215 requests the MFP 300 to transmit printing setting information in time when the image processing unit 315 on the MFP 300 side executes image processing of the printing job. Printing setting information is information required for printing such as color settings, paper size, font size and the like.

(Step S108)

The system control unit 215 transmits the printing setting information that is obtained from the MFP 300 to the user terminal 100.

In this case, the system control unit 118 on the user terminal 100 side instructs the simulated image processing unit 115 to perform a simulation process based on the printing setting information from the MFP 300 side.

(Step S109)

The system control unit 215 obtains printing data information and vibration detection information from the user terminal 100.

In this case, the system control unit 215 requests the user terminal 100 to transmit the printing data information and vibration detection information. The system control unit 118 on the user terminal 100 side transmits printing data information that indicates the data amount of printing data that is generated in the simulation process by the simulated image processing unit 115, and the vibration detection information by the vibration detection sensor 102 to the gateway 200.

(Step S110)

The system control unit 215 obtains the printing data information and vibration detection information from the MFP 300.

In this case, the system control unit 215 requests the MFP 300 to transmit printing data information and vibration detection information. The system control unit 319 on the MFP 300 side transmits printing data information that indicates the data amount of printing data that is processed by the image processing unit 315 just before starting printing, and the vibration detection information by the vibration detection sensor 303 to the gateway 200.

(Step S111)

The system control unit 215 registers the printing data information and the vibration detection information that is received from the user terminal 100 and the MFP 300.

In this case, the system control unit 215 registers the printing data information that is received from the user terminal 100 and the MFP 300 in the printing data information DB 211a of the memory 211. Moreover, the system control unit 215 registers the vibration detection information that is received from the user terminal 100 and MFP 300 in the vibration detection information DB 211b of the memory 211.

(Step S112)

The system control unit 215 transmits printing data information and vibration detection information to the cloud server 400.

In this case, the system control unit 215 transmits the printing data information of the user terminal 100 and MFP 300 that is registered in the printing data information DB 211a of the memory 211 to the cloud server 400. Moreover, the system control unit 215 transmits vibration detection information of the user terminal 100 and MFP 300 that is registered in the vibration detection information DB 211b of the memory 211 to the cloud server 400.

The system control unit 414 of the cloud server 400 registers the printing data that is received from the gateway 200 in the printing data information DB 411a of the memory 411, and registers the vibration detection information by the vibration detection sensor 102 in the vibration detection information DB 411b.

(Step S113)

The system control unit 215 determines whether or not there is a difference between the data amounts.

In this case, the system control unit 215 compares the amount of data of printing data after the simulation process from the user terminal 100 that are registered in the printing data information DB 211a of the memory 211 with the amount of data of printing data just before starting printing from the MFP 300. When it is determined that there is no difference between the data amounts (step S113: NO), the system control unit 215 ends processing.

However, when it is determined that there is a difference in the data amounts (step S113: YES), the system control unit 215 moves to step S114.

There may be specified differences in the data amounts of printing data stored on the user terminal 100 side and the MFP 300 side. This is due to difference in the processing speed by the simulated image processing unit 115 and the processing speed by the image processing unit 315, difference in the storage capacities of the HDD 105 and the HDD 305, difference in writings speeds and the like. In this case, the system control unit 215 may determine that there is a difference in the data amounts when the difference in the data amounts exceeds a specified difference.

Moreover, the difference in the data amounts on the user terminal 100 side and the MFP 300 side may be affected by difference in the vibration applied to the HDDs 105, 305 of the user terminal 100 and the MFP 300. In this case, the system control unit 215 compares the vibration detection information from the user terminal 100 with the vibration detection information from the MFP 300, and determines whether or not there is a difference in data amounts by determining whether or then the difference in the vibration detection results is greater than a specified difference.

(Step S114)

The system control unit 215 registers problem information.

In this case, the system control unit 215 registers problem information indicating that there is a problem in image processing (rasterization) in the problem information DB 211c of the memory 211. Problem information may include, for example, the registration date of printing data information, vibration detection information, and the like.

(Step S115)

The system control unit 215 transmits problem information to the cloud server 400.

In this case, the system control unit 215 transmits problem information that is registered in the problem information DB 211c to the cloud server 400. The system control unit 414 of the cloud server 400 registers problem information from the gateway 200 for the MFP 300 side in the problem information DB 411c of the memory 411.

(Step S116)

The system control unit 215 retransmits the printing job to the MFP 300.

In this case, the system control unit 215 retransmits the printing job that is registered in the printing data information DB 211a to the MFP 300.

Here, the reason for the system control unit 215 to retransmit the printing job to the MFP 300 is in order to recheck the difference in the data amounts of the printing data in image process by the image processing unit 315 on the MFP 300 side.

(Step S117)

The system control unit 215 reobtains the printing data information and the vibration detection information from the MFP 300.

In this case, the system control unit 215 requests the MFP 300 to transmit the printing data information and the vibration detection information. The system control unit 319 on the MFP 300 side transmits printing data information that indicates the data amount of printing data just before starting printing that is reprocessed by the image processing unit 315, and vibration detection information by the vibration detection sensor 303 to the gateway 200.

(Step S118)

The system control unit 215 reregisters the printing data information and vibration detection information.

In this case, the system control unit 215 reregisters the printing data information that is received from the MFP 300 in the printing data information DB 211a of the memory 211. Moreover, the system control unit 215 reregisters the vibration detection information that is received from the MFP 300 in the vibration detection information DB 211b of the memory 211.

(Step S119)

The system control unit 215 determines whether or not there is a difference in the data amounts.

In this case, the system control unit 215 compares the data amount of the printing data after the simulation process from the user terminal 100 that is registered in the printing data information DB 211a of the memory 211, with the data amount of the printing data just before starting printing from the MFP 300 that is reregistered in the printing data information DB 211a of the memory 211. When it is determined that there is no difference in data amounts (step S119: NO), the system control unit 215 ends processing.

However, when it is determined that there is a difference in the data amounts (step S119: YES), the system control unit 215 moves to step S120.

In this case, in the same way as described above, the system control unit 215 may determine that there is a difference in the data amounts when the difference in the data amounts exceeds a specified difference.

(Step S120)

The system control unit 215 reregisters problem information in the problem information DB 211c of the memory 211.

In this case, the system control unit 215, in the same way as described above, registers problem information that includes data indicating a difference in the data amounts, and data related to a problem in image processing. Moreover, as was described above, problem information may also include, for example, the registration date of printing data information, vibration detection information and the like.

(Step S121)

The system control unit 215 transmits problem information to the cloud server 400.

In this case, the system control unit 215 transmits problem information that is reregistered in the problem information DB 211c to the cloud server 400, then ends processing. The system control unit 414 of the cloud server 400 reregisters the problem information of the MFP 300 side from the gateway 200 in the problem information DB 411c of the memory 411.

In this case, the system control unit 215 may also notify the user terminal 100 that a problem occurred.

In this way, in this embodiment, after the gateway 200 (relay device) registers a printing job (job data) that is received from the user terminal 100 in the memory 211 (storage device), the gateway 200 transmits the printing job (job data) to the MFP 300. The MFP 300 transmits printing data information (second job data information) that indicates the amount of data of printing data that is generated when the image processing unit 315 performs image processing on the printing job (job data) to the gateway 200 (relay device). The user terminal 100 transmits printing data information (first job data information) that indicates the amount of data of printing data that is generated when the simulated image processing unit 115 performs a simulation process on the printing job (job data) to the gateway 200 (relay device). Then, the gateway 200 (relay device) compares the printing data information (first job data information) with the printing data information (second job data information). When there is a difference in data amounts, the gateway 200 (relay device) registers problem information that indicates that there is a problem in image processing by the simulated image processing unit 115 or the image processing unit 315 in the memory 211 (storage device).

As a result, by referencing the problem information that is registered in the memory 211 (storage device) of the gateway 200 (relay device), it is possible to detect the occurrence of a problem in image processing of a printing job before starting printing. Furthermore, by checking the change in contents of the problem information that is registered in the memory 211 (storage device) of the gateway 200 (relay device), it is possible to predict a problem in image processing.

In FIG. 4, detection of a problem in image processing on the MFP 300 side is explained presuming that a simulation process by the simulated image processing unit 115 is performed normally on the user terminal 100 side. However, detection of a problem in the simulation process on the user terminal 100 side is also possible presuming that image processing by the image processing unit 315 on the MFP 300 side is performed normally.

Moreover, in FIG. 4, detection of problems in image processing on the MFP 300 side is explained presuming that a simulation process by the simulated image processing unit 115 is performed normally on the user terminal 100 side. However, a problem may be considered to have occurred in image processing, simply by there being a difference in the data amounts on the user terminal 100 side and the MFP 300 side.

Furthermore, in FIG. 4, in order to recheck, the system control unit 215 retransmits the printing job to the MFP 300 in step S116, however, retransmission of the printing job is not limited to one time, and may be performed a specified number of times (for example, retransmission can be limited to three times). In this case, in the determination in step S119, when the difference in the data amounts is determined to be smaller than in the previous time, it is possible to confirm that the degree of the problem in image processing is small. However, in the determination of step S119, when the difference in the data amounts is determined to be larger than in the previous time, it is possible to confirm that the degree of the problem in image processing is large.

Processing to retransmit the printing job in step S116 can also be omitted. In this case, it is not necessary to perform the processing from step S177 to S121, and thus it is possible to reduce the processing load. Moreover, after transmitting the problem information to the cloud server 400 in step S115, it is also possible to notify the user terminal 100 that a problem occurred.

Furthermore, in the embodiment described above, the simulated image processing unit 115 executes a simulation process (simulation) that is the same as the image processing (rasterization) on the printing job that is executed by the image processing unit 315 on the MFP 300 side. However, in addition to rasterization, a simulation process can also be executed that is the same as color conversion or other image processing that is executed by the image processing unit 315.

With a typical image processing device described above, when vibration is detected by the vibration detection sensor, a storage controller changes the information storage destination from the HDD to a non-volatile memory, so problems with the HDD due to vibration can be eliminated without being restricted by the device design.

Incidentally, in that image processing device, evacuation of information is possible, however, there is a problem in that it is not possible to detect or predict the occurrence of problems in image processing of a printing job before starting printing.

With the data transmission system and data transmission method of the present disclosure, by referencing problem information that is registered in a storage device of a relay device, it is possible, for example, to detect the occurrence of a problem in image processing of a printing job before starting printing. Furthermore, by checking the change in the contents of problem information that is registered in the storage device of the relay device, it is possible to predict a problem in image processing.

What is claimed is:

1. A data transmission system, comprising:
   a user terminal that has a first storage device, and a simulated image processing unit, the simulated image processing unit performing a simulation process on job data;
   an image forming apparatus that has a second storage device and an image processing unit, the image processing unit performing image processing on the job data; and
   a relay device that has a third storage device, registers job data that is received from the user terminal in the third storage device, and then transmits the job data to the image forming apparatus; wherein
   the user terminal transmits first information for the job data that is stored in the first storage device to the relay device;
   the image forming apparatus registers the job data that is received from the relay device in the second storage device, and transmits second information for the job data to the relay device;
   the relay device compares the first information with the second information, and when there is a difference in the data amounts, registers problem information that indicates that there is a problem in image processing of the simulated image processing unit or the image processing unit in the storage device;
   the first information comprises first vibration detection information and the second information comprises vibration detection information;
   the user terminal further has a first vibration detection sensor that detects vibration that is applied to the first storage device, and transmits the first vibration detection information to the relay device, wherein the first vibration detection information indicates the detection results by the first vibration detection sensor in time when operating the job data;
   the image forming apparatus further has a second vibration detection sensor that detects vibration that is applied to the second storage device, and transmits the second vibration detection information to the relay device, wherein the second vibration detection information indicates the detection results by the second vibration detection sensor in time when operating the job data;
   said comparing the first information with the second information comprises comparing the first vibration detection information with the second vibration detection information, and
   the relay device determines that there is a difference in the data amounts when the difference between the first vibration detection information and the second vibration detection information exceeds a specified difference.

2. The data transmission system according to claim 1, wherein
   the user terminal transmits first job data information that indicates a data amount in time when the simulated image processing unit performs a simulation process on the job data to the relay device as the first information;
   the image forming apparatus transmits second job information that indicates a data amount in time when the image processing unit performs image processing on the job data to the relay device as the second information; and
   the relay device determines there is a difference in the data amount when the difference between the data amount of the first job data information and the data amount of the second job data information exceeds a specified difference.

3. The data transmission system according to claim 1, wherein
   the relay device obtains setting information that is necessary for image processing by the image processing unit, and transmits the setting information to the user terminal; and
   the simulated image processing unit executes a simulation process on the job data based on the setting information.

4. A data transmission system, comprising:
   a user terminal that has a first storage device, and a simulated image processing unit, the simulated image processing unit performing a simulation process on job data;
   an image forming apparatus that has a second storage device and an image processing unit, the image processing unit performing image processing on the job data; and
   a relay device that has a third storage device, registers job data that is received from the user terminal in the third storage device, and then transmits the job data to the image forming apparatus; wherein
   the user terminal transmits first information for the job data that is stored in the first storage device to the relay device;
   the image forming apparatus registers the job data that is received from the relay device in the second storage device, and transmits second information for the job data to the relay device;
   the relay device compares the first information with the second information, and when there is a difference in the data amounts, registers problem information that indicates that there is a problem in image processing of the simulated image processing unit or the image processing unit in the storage device; and the third storage device has
- a job data information database for registering the job data, the first information, and the second information; and
- a problem information database for registering the problem information.

5. A data transmission method that is executed by a data transmission system that comprises: a user terminal having a first storage device and a simulated image processing unit; an image forming apparatus having a second storage device and an image processing unit; and a relay device having a third storage device; whereby the user terminal transmits job data;

the user terminal transmits first information for the job data that is stored in the first storage device to the relay device;

the relay device registers the job data that is received from the user terminal in the third storage device, and then transmits the job data to the image forming apparatus;

the image forming apparatus registers the job data that is received from the relay device in the second storage device, and transmits second information for the job data to the relay device; and the relay device compares the first information with second information, and when it is determined that there is a difference in the data amounts, registers problem information indicating that there is a problem in image processing by the simulated image processing unit or by the image processing unit in the storage device; wherein the first information comprises first vibration detection information and the second information comprises vibration detection information;

the user terminal has a first vibration detection sensor for detecting vibration that is applied to the first storage device, and transmits the first vibration detection information to the relay device, wherein the first vibration detection information indicates the detection results by the first vibration detection sensor in time when operating the job data;

the image forming apparatus has a second vibration detection sensor for detecting vibration that is applied to the second storage device, and transmits the second vibration detection information to the relay device, wherein the second vibration detection information indicates the detection results by the second vibration detection sensor in time when operating the job data;

said comparing the first information with the second information comprises comparing the first vibration detection information with the second vibration detection information, and the relay device determines there is a difference in the data amounts when the difference between the first vibration detection information and the second vibration detection information exceeds a specified difference.

6. The data transmission method according to claim 5, whereby the user terminal transmits first job data information that indicates the data amount in time when the simulated image processing unit performs a simulation process on the job data to the relay device as the first information;

the image forming apparatus transmits second job data information that indicates the data amount in time when the image processing unit performs image processing on the job data to the relay device as the second information; and the relay device determines that there is a difference in the data amounts when the difference between the data amount of the first job data information and the data amount of the second job data information exceeds a specified difference.

7. The data transmission method according to claim 5, whereby the relay device obtains setting information that is necessary for image processing by the image processing unit, and transmits the setting information to the user terminal; and the simulated image processing unit executes a simulated process on the job data based on the setting information.

* * * * *